United States Patent [19]

Christian

[11] Patent Number: 5,253,825
[45] Date of Patent: Oct. 19, 1993

[54] AIRCRAFT SKI

[76] Inventor: Melvyn R. Christian, R.R. #1, Woodlands, Manitoba, Canada, R0C 3H0

[21] Appl. No.: 921,945

[22] Filed: Jul. 30, 1992

[51] Int. Cl.⁵ .............................................. B64C 25/52
[52] U.S. Cl. ........................................ 244/108; 280/11
[58] Field of Search ................ 244/108, 105; 114/271, 114/283; 280/10, 11, 9

[56] References Cited
U.S. PATENT DOCUMENTS

| | | | |
|---|---|---|---|
| 2,315,098 | 3/1943 | Simpson et al. | 244/108 |
| 2,733,026 | 1/1956 | Ditter | 244/108 |
| 2,864,624 | 12/1958 | Lindelof et al. | 244/108 |
| 2,925,970 | 2/1960 | Heaslip | 244/108 |
| 2,977,073 | 3/1961 | Ditter et al. | 244/108 |

Primary Examiner—Joseph F. Peters, Jr.
Assistant Examiner—Anne E. Bidwell
Attorney, Agent, or Firm—Adrian D. Battison; Murray E. Thrift; Stanley G. Ade

[57] ABSTRACT

An aircraft ski for attachment to the axle of the ground wheel of the aircraft includes a pair of rams moving the ski upwardly and downwardly from a retracted position to a deployed position. On each side of the ski is provided a respective lever which is connected to the axle and extends therefrom rearwardly to a rear end of the ski. Intermediate the length of the lever is provided a cross torque tube which prevents twisting movement of the ski as it is deployed. At a rear end of each of the levers is provided a cross shaft which is attached to the rear end so that the cross shaft is rotated as the lever moves with the deployment of the ski. The cross shaft is attached to a rear restraint cable which is thus paid out and drawn in respectively by the movement of the ski between the deployed and retracted positions. A front restraint cable extends from a forward end of the ski to the aircraft. The rear restraint cable is of fixed length and thus causes the rear end of the ski to be moved upwardly when the ski is retracted thus forcing the forward end downwardly to avoid contact with the propeller.

20 Claims, 3 Drawing Sheets

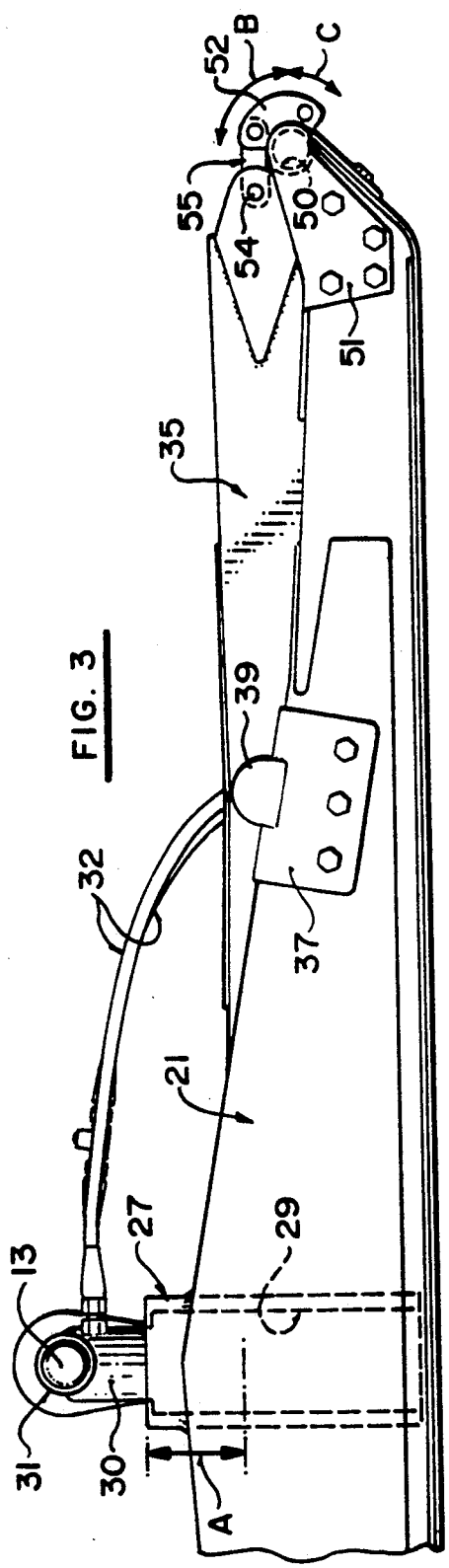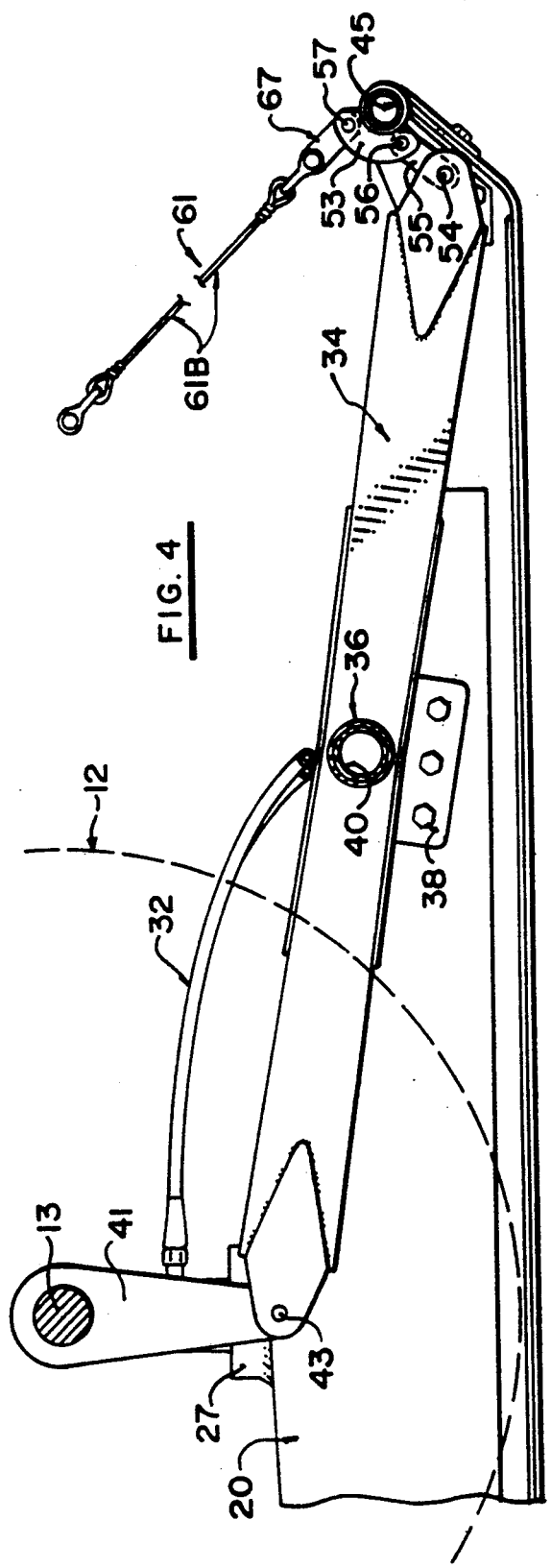

AIRCRAFT SKI

FIELD OF THE INVENTION

This invention relates to a landing wheel and ski combination for an aircraft for use of a tire surface in movement across firm ground and a ski surface for movement across snow-covered ground, the ski being movable from a raised or retracted position in which the tire surface of the wheel projects through the ski to a lowered or deployed position in which the ski surface lies at the same height or slightly below the tire surface.

BACKGROUND OF THE INVENTION

Aircraft skis have been manufactured by the present applicant for some years and one particular design shown in printed literature includes a pair of rams each extending from a respective end of the axle of the ground wheel downwardly into engagement with a frame structure of the ski. A lever and torque tube arrangement is arranged so that a lever is connected to each end of the axle and extends to a torque tube connected to the frame structure at a positioned spaced from the axle. The torque tube thus equalizes the movement of the rams so that the ski moves downwardly and upwardly simultaneously on each side of the wheel to prevent twisting or binding of the rams.

The front and rear ends of the ski are tethered by cables which extend from the ski to the aircraft at a suitable location thereon. Each cable includes an elastic section so that the movement of the ski, both from the raising and lowering movement and also from forces due to wind pressure and contact with the ground, are taken up by stretching of the elastic sections.

An alternative arrangement of ski is shown in U.S. Pat. No. 2,977,073 (Ditter) which shows a similar ski arrangement but in this case the ski movement is actuated by a bell crank moved by a ram mounted within the ski body. The ski is tethered by cables which are connected to the actuator mechanism and extend therefrom over pulleys at the front and rear of the ski and from that position to suitable locations on the aircraft. Each of the cables includes an elastic section and is stated to comprise shock cord rigging of a conventional nature. It appears from the drawings, although this is not described, that movement of the ski to the lowered position causes a pay out of the cable connected to the rear part of the ski by an amount to accommodate the downward movement necessary by the rear part of the ski. The description is silent in this matter and the drawings are clearly incorrect since the movement of the ski is insufficient to withdraw the ski to a position above the height of the wheel so that it will still engage the ground when it is not intended to be deployed.

A recently developed aircraft is the Cessna 208 Caravan which has a particularly unusual configuration in that the spacing between wheel and the envelope of the propeller varies fore and aft as well as vertically with wheel loading. This has therefore lead to difficulties in developing a ski for this particular aircraft which will allow the ski to operate effectively in the raised and deployed positions without the possibility of contacting the propeller with the obvious catastrophic results.

SUMMARY OF THE INVENTION

It is one object of the invention, therefore, to provide an improved ski design which is particularly but not exclusively designed for the above Cessna 208 Carvan.

According to a first aspect of the invention there is provided a landing wheel and ski combination for an aircraft for use of a tire surface in movement across firm ground and a ski surface for movement across snow-covered ground, the combination comprising a rotatable landing wheel having a ground-engaging tire surface, an axle on which the wheel is mounted for rotation, a support assembly for the axle for mounting the wheel on the aircraft, a ski assembly mounted on the axle so as to be carried thereby, the ski assembly including a bottom ski surface for movement across the snow-covered ground, a frame structure providing structural support for the ski surface, ram means actuable to cause movement of the frame structure through a movement length relative to the axle between a first raised position in which the tire surface projects below the ski surface for movement across the firm ground and a second lowered position in which the ski surface is arranged at or below the tire surface for movement across the snow-covered ground, a front cable restraining means connected to a position on the frame structure forwardly of the axle, a rear cable restraining means connected to the frame structure rearwardly of the axle, said front and rear cable restraining means being arranged to maintain a required attitude of the ski about the axle, said front cable restraining means being elastically extendible and said rear cable restraining means being non-extendible, and means responsive to said movement of the frame structure relative to the axle to cause movement of the rear cable restraining means relative to the frame structure by length greater than the movement length thus allowing said position on the frame structure rearwardly of the axle to move by a first distance to accommodate said movement length and a second distance beyond said first distance to change said attitude of the ski surface about the axle.

According to a second aspect of the invention there is provided a landing wheel and ski combination for an aircraft for use of a tire surface in movement across firm ground and a ski surface for movement across snow-covered ground, the combination comprising a rotatable landing wheel having a ground-engaging tire surface, an axle on which the wheel is mounted for rotation, a support assembly for the axle for mounting the wheel on the aircraft, a ski assembly mounted on the axle so as to be carried thereby, the ski assembly including a bottom ski surface for movement across the snow-covered ground, a frame structure providing structural support for the ski surface, ram means actuable to cause movement of the frame structure through a movement length relative to the axle between a first raised position in which the tire surface projects below the ski surface for movement across the firm ground and a second lowered position in which the ski surface is arranged at or below the tire surface for movement across the snow-covered ground, a front cable restraining means connected to a position on the frame structure forwardly of the axle, a rear cable restraining means connected to the frame structure rearwardly of the axle, said front and rear cable restraining means being arranged to maintain a required attitude of the ski about the axle, and lever means responsive to said movement of the frame structure relative to the axle to cause movement of the rear cable restraining means relative to the frame structure, said lever means comprising a link member mounted on said frame structure at said position on the frame structure rearwardly of said axle, means mounting the link member for rotation about an axis transverse to the frame assembly, an end of the rear cable restraining means being attached to the link member such that said rotation of the link member about said axis causes the rear cable restraining means to be paid out and drawn in relative to the frame structure, an elongate lever extending longitudinally of the frame structure, means at a first end of the lever connecting the first end of the lever to the axle, means at a second end of the lever connecting the second end of the lever to said link member and fulcrum means intermediate said first and second ends of the lever mounted on said frame structure such that movement of the frame structure relative to the axle causes pivoting of the lever to rotate the link member about the axis.

According to a third aspect of the invention there is provided a landing wheel and ski combination for an aircraft for use of a tire surface in movement across firm ground and a ski surface for movement across snow-covered ground, the combination comprising a rotatable landing wheel having a ground-engaging tire surface, an axle on which the wheel is mounted for rotation, a support assembly for the axle for mounting the wheel on the aircraft, a ski assembly mounted on the axle so as to be carried thereby, the ski assembly including a bottom ski surface for movement across the snow-covered ground, a frame structure providing structural support for the ski surface, ram means actuable to cause movement of the frame structure through a movement length relative to the axle between a first raised position in which the tire surface projects below the ski surface for movement across the firm ground and a second lowered position in which the ski surface is arranged at or below the tire surface for movement across the snow-covered ground, a front cable restraining means connected to a position on the frame structure forwardly of the axle, a rear cable restraining means connected to the frame structure rearwardly of the axle, said front and rear cable restraining means being arranged to maintain a required attitude of the ski about the axle, and lever means responsive to said movement of the frame structure relative to the axle to cause movement of the rear cable restraining means relative to the frame structure position, said lever means comprising a link member mounted on said frame structure at said position on the frame structure rearwardly of said axle, means mounting the link member for rotation about an axis transverse to the frame assembly, an end of the rear cable restraining means being attached to the link member such that rotation of the link member about said axis causes the rear cable restraining means to be paid out and drawn in relative to the frame structure, a first and a second lever extending longitudinally of the frame structure, means at a first end of each of the first and second levers connecting the first end of each of the first and second levers to a respective end of the axle, a torque tube interconnecting the first and second levers mounted on the frame structure and arranged to maintain simultaneous movement of the frame structure relative to the ends of the axle and means connecting the torque tube to the link member such that movement of the frame structure relative to the axle causes pivoting of the first and second levers to rotate the link member about the axis.

One embodiment of the invention will now be described in conjunction wit the accompanying drawings in which:

BRIEF DESCRIPTION OF THE DRAWINGS

FIG. 3 is a side elevational view of the rear part only of the ski of FIG. 1 again in the retracted position.

FIG. 4 is a cross sectional view similar to that of FIG. 2 showing the rear part only of the ski in the deployed or lowered position.

In the drawings, like characters of reference indicate corresponding parts in the different figures.

DETAILED DESCRIPTION

Figure 2:
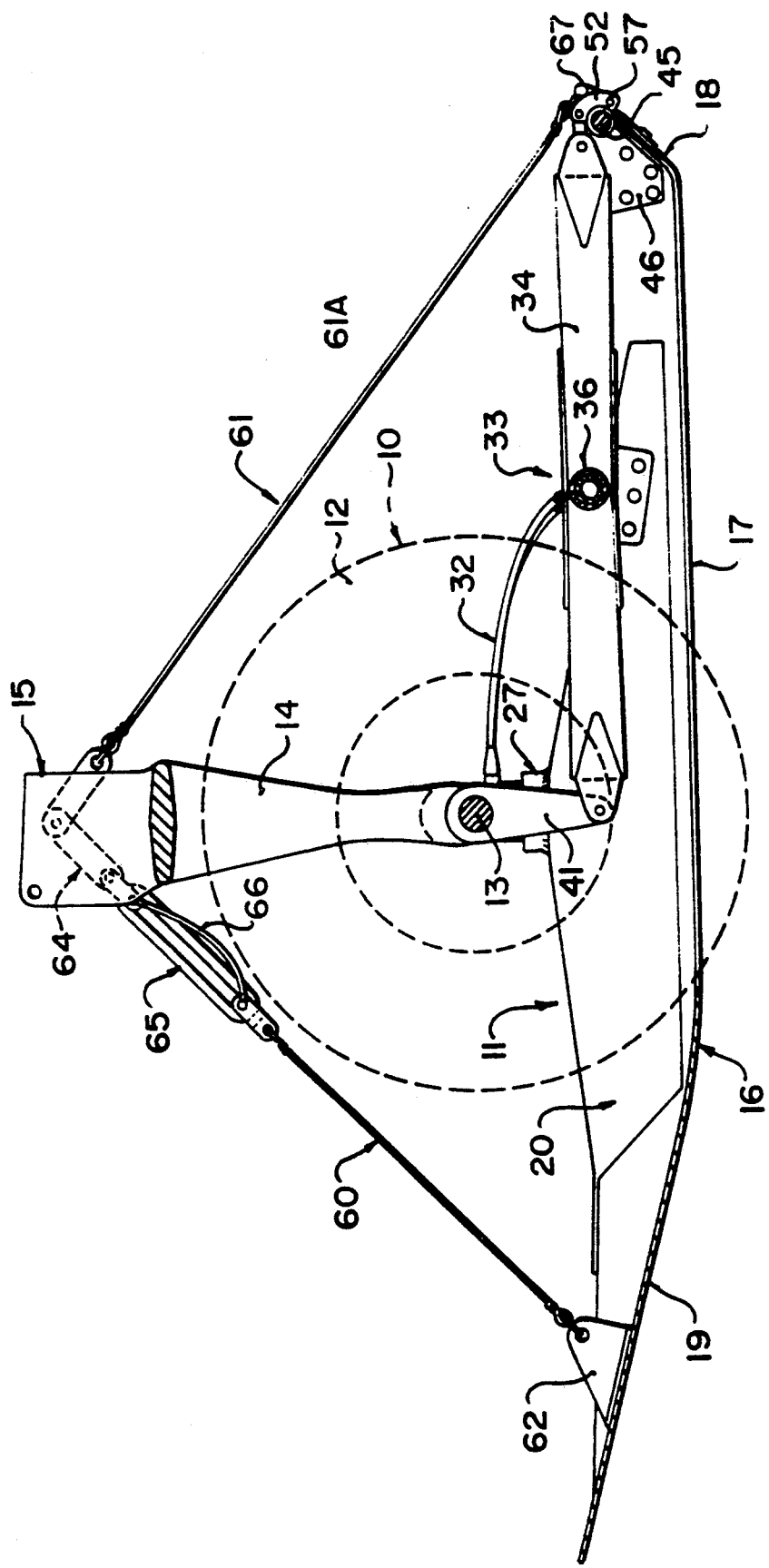
FIG. 2 is a cross sectional view along the lines 2—2 of FIG. 1 showing the ski in the raised or retracted position relative to the wheel assembly.

In FIG. 2 is shown the wheel assembly in total including a ground wheel 10 and a ski assembly 11 mounted on the ground wheel. The ground wheel includes a tire 12 arranged for rolling across the ground during landing, taking off and taxiing and the wheel is mounted upon an axle 13 for rotation about the horizontal axis of the axle. The axle is carried upon a yoke 14 straddling the wheel 10. The yoke is attached to a wheel support element 15 which is of conventional construction and is shown only schematically. The wheel support element is in use attached to the suspension system of the aircraft which does not form part of the present invention and therefore will not be described in detail. The details and specification of a suitable suspension system can be found from the Cessna 208 Caravan which is commercially available and the details of the structure can thus be inspected.

Figure 1:
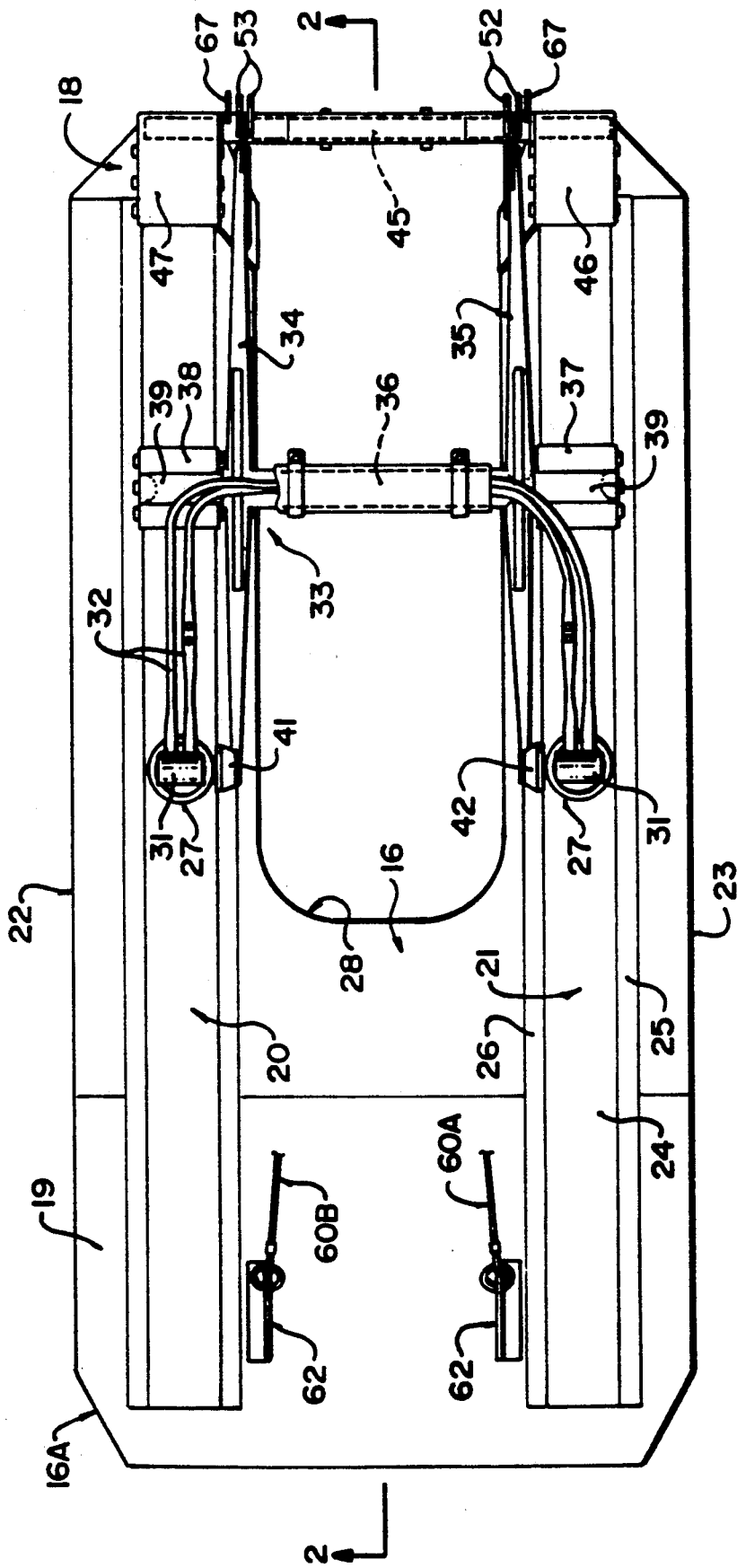
FIG. 1 is a top plan view of the ski according to the present invention with the wheel assembly omitted for convenience of illustration.

The ski 11 comprises a ski surface 16 in the form of a plate formed from a suitable material which is generally rectangular in plan as best shown in FIG. 1 with the corners chambered as indicated at 17 for better flow over the snow. As shown in FIG. 2, a main part 17 of the ski is planar and lies substantially horizontal, the main part extending from a relatively short rear part 18 to a forward part 19. The forward part is inclined upwardly and forwardly in a conventional ski shape so as to slide over the snow. The rear part 18 is turned sharply upwardly to define a rear edge of the ski.

The ski surface 16 is supported by a pair of frame elements 20 and 21 which extend longitudinally of the ski and are spaced apart so as to lie along side edges 22 and 23 of the ski. The frame elements are spaced slightly inwardly from the side edges and are formed from box beams having a horizontal top surface 24 and outwardly and downwardly inclined side surfaces 25 and 26 welded to the ski surface 16. The frame elements are suitably shaped and designed in accordance with good engineering practice to communicate forces from the ski surface to a central ram collar 27 located approximately midway along the length of each of the frame elements.

The ski surface 16 has an opening 28 extending from a position just behind the junction between the incline portion 19 and the horizontal main portion 17 and extending therefrom rearwardly to the rear edge with the opening breaking out through the rear edge. The opening is thus shaped to receive the tire 12 which can move downwardly to project through the opening 28 as shown in FIG. 2 in the retracted position of the ski.

The ski is mounted on the axle 13 by a pair of hydraulic rams each carried within a respective one of the ram collars 27. Thus each ram includes a cylinder 29 received within the ram collar and extending downwardly therefrom into the interior of the frame structure 21, 22. A piston 30 extends vertically upwardly from the cylinder 29 and emerges through the ram collar 27 with an upper end carrying a transverse sleeve 31 surrounding the axle 13. The cylinder 29 is supplied with hydraulic fluid by a pair of feed lines 32 which supply fluid under pressure from the control system mounted in the aircraft. The cylinder is a double-acting cylinder of a conventional nature so that expansion of the cylinder causes downward movement of the ski to a deployed position and retraction movement of the cylinder causes the ski to be moved upwardly to the retracted position shown in FIG. 2.

A control lever system for controlling the attitude of the ski is indicated generally at 33. The control lever system includes a first lever 34 and a second lever 35 each extending longitudinally of the ski from a first end adjacent the axle 13 to a second end at the rear end 18 of the ski. Each of the levers 34 and 35 is connected to a transverse torque tube 36 which communicates torque between the levers and thus maintains the levers in simultaneous movement. The torque tube 36 is mounted for rotation on a cross shaft 40 carried on the frame elements 20 and 21 in respective brackets 38 and 37. The cross shaft 40 holds the torque tube in fixed position relative to the frame elements but allows the torque tube to rotate around the cross shaft with the levers 34 and 35. Each of the brackets 37 and 38 includes a sleeve 39 upstanding from the top surface of the respective frame element and a pair of plates welded to the sleeve which bolt the bracket to the respective frame element.

An inner end of each of the levers 34 and 35 is connected to a coupling link 41, 42 each of which is mounted on the axle for rotation about the axle and carried in fixed position relative to the axis of the axle 13. Each of the links 41, 42 depends downwardly as shown in FIGS. 2 and 4 and is pivotally coupled to a pivot pin 43 at an inner end of the respective lever.

The levers 34 and 35 together with the torque tube 36 thus act to stabilize the vertical movement of the ski so that the actuation of the rams is balanced to provide simultaneous movement of each side of the ski relative to the axle. This prevents binding or twisting of the ski.

At the rear end of the ski is provided a cross shaft 45 which is mounted on the frame elements by brackets 46 and 47 allowing rotation of the cross shaft 45 about its axis but holding the cross shaft fixed in relation to the ski. Similarly to the brackets 37 and 38, the brackets 46 and 47 include a support sleeve 50 for the end of the cross shaft 45 together with bracket side plates 51 which bolt the sleeve to the side surfaces of the respective frame element.

Upon the outside surface of the cross shaft 45 is mounted a pair of segment members 52 and 53 which project outwardly from the cross shaft in radial planes spaced apart across the length of the shaft. Thus each segment member is arranged adjacent respective ends of the shaft and aligned with a respective one of the levers 34 and 35. Each of the segment members rotates commonly with the cross shaft 45.

The outer end of each of the levers 34 and 35 carries a pivot pin 54 to which is attached a coupling link 55 extending from the pivot pin to a pivot pin 56 on the segment member 53.

It will be noted therefore from comparison of the position shown in FIGS. 3 and 4 that in the deployed position shown in FIG. 4 the lever 34 is rotated in a clockwise direction thus causing rotation of the segment member 53 about the axis of the cross shaft 45 in a counterclockwise direction. In the position shown in FIG. 3 which is the retracted position, the lever is rotated in a counterclockwise direction so that the outer end of the lever pushes the segment member 53, 52 in a clockwise direction. The segment member extends over approximately 120° of arc of the cross shaft 45 with the pivot pin 56 at one end and a second pivot pin 57 at an opposed angular end.

The attitude of the ski about the axis of the axle 13 is controlled by forward cable restraining elements 60 and rearward cable restraining elements 61. The front cable restraining elements comprises a pair of cables 60A and 60B each of which is connected to a respective bracket 62 mounted on the ski surface 16 at a position just inward of the respective frame member. From the bracket the cable 60A, 60B extends upwardly and rearwardly to a coupling 64 on the aircraft or more particularly on the support assembly 15 for the yoke 14. The cables 60A and 60B each include an elastic section 65 in the form of an elastic loop the length of which is restricted by a cable portion 66 which is normally slack but can be tightened at the maximum extent of the elastic band 65.

The rear cable restraint similarly comprises a pair of cables 61A and 61B which are similarly connected at the upper end to the support assembly 15. Each of the cables is connected to a respective one of the segment members 52, 53 by a link 67 pivotally mounted by a link 67 pivotally mounted on the pin 57 as best shown in FIG. 4. The cables 61A and 61B are of fixed, non-extendible length and thus include no elastic band section. The cable thus prevents the rear end from moving downwardly to a position beyond the fixed length of the cable although of course the cable can slacken to allow the rear end to move upwardly should this occur due to forces stretches the elastic band 65.

From a comparison of FIGS. 2 and 4, therefore, it will be noted that the operation of the lever causes the link 67 to pivoted about the axis of the cross shaft 45 to pay out and draw in the length of the cables 61A and 61B. The cable is fully paid out in the deployed position of FIG. 4 and fully drawn in the retracted position of FIG. 2. The amount of movement is determined by the radius of the segment member and particularly the position of the pivot pin 57 thereon. This amount of movement through approximately 180° provides a change in the length of the cable which provides a first movement length B sufficient to accommodate the amount of vertical movement A of the ski but in addition to provide an additional amount of movement C which allows the rear end of the ski to move downwardly in the deployed position FIG. 4. Thus in the retracted position FIG. 2 the rear end of the ski moves through the length B upwardly with the retraction of the main part of the ski but in addition is moved further movement A upwardly through the length C into an inwardly retracted position thus pulling the front end of the ski downwardly. This ensures that the front end of the ski is maintained at a lower position to avoid any possibility of contact with the propeller (not shown) of the particular aircraft with which the present device is intended for use.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A landing wheel and ski combination for an aircraft for use of a tire surface in movement across firm ground and a ski surface for movement across snow-covered ground, the combination comprising a rotatable landing wheel having a ground-engaging tire surface, an axle on which the wheel is mounted for rotation, a support assembly for the axle for mounting the wheel on the aircraft, a ski assembly mounted on the axle so as to be carried thereby, the ski assembly including a bottom ski surface for movement across the snow-covered ground, a frame structure providing structural support for the ski surface, ram means actuable to cause movement of the frame structure through a movement length relative to the axle between a first raised position in which the tire surface projects below the ski surface for movement across the firm ground and a second lowered position in which the ski surface is arranged at a height relative to the tire surface for movement across the snow-covered ground, a front cable restraining means connected to a position on the frame structure forwardly of the axle, a rear cable restraining means connected to the frame structure at a position thereon rearwardly of the axle, said front and rear cable restraining means being arranged to maintain a required attitude of the ski about the axle, said front cable restraining means being elastically extendible and said rear cable restraining means being non-extendible, and means responsive to said movement of the frame structure relative to the axle to cause movement of the rear cable restraining means relative to the frame structure by length greater than the movement length thus allowing said position on the frame structure rearwardly of the axle to move by a first distance to accommodate said movement length and a second distance beyond said first distance to change said attitude of the ski surface about the axle.

2. A landing wheel and ski combination for an aircraft for use of a tire surface in movement across firm ground and a ski surface for movement across snow-covered ground, the combination comprising a rotatable landing wheel having a ground-engaging tire surface, an axle on which the wheel is mounted for rotation, a support assembly for the axle for mounting the wheel on the aircraft, a ski assembly mounted on the axle so as to be carried thereby, the ski assembly including a bottom ski surface for movement across the snow-covered ground, a frame structure providing structural support for the ski surface, ram means actuable to cause movement of the frame structure through a movement length relative to the axle between a first raised position in which the tire surface projects below the ski surface for movement across the firm ground and a second lowered position in which the ski surface is arranged at a height relative to the tire surface for movement across the snow-covered ground, a front cable restraining means connected to a position on the frame structure forwardly of the axle, a rear cable restraining connected to the frame structure at a position thereon rearwardly of the axle, said front and rear cable restraining means being arranged to maintain a required attitude of the ski about the axle, and lever means responsive to said movement of the frame structure relative to the axle to cause movement of the rear cable restraining means relative to the frame structure, said lever means comprising a link member mounted on said frame structure at said position on the frame structure rearwardly of said axle, means mounting the link member for rotation about an axis transverse to the frame assembly, an end of the rear cable restraining means being attached to the link member such that said rotation of the link member about said axis causes the rear cable restraining means to be paid out and drawn in relative to the frame structure, an elongate lever extending longitudinally of the frame structure, means at a first end of the lever connecting the first end of the lever to the axle, means at a second end of the lever connecting the second end of the lever to said link member and fulcrum means intermediate said first and second ends of the lever mounted on said frame structure such that movement of the frame structure relative to the axle causes pivoting of the lever to rotate the link member about the axis.

3. The combination according to claim 2 wherein said means mounting the link member comprises a link shaft extending transversely to the frame structure.

4. The combination according to claim 3 wherein the link shaft carries a segment portion on a surface thereof projecting radially outwardly therefrom and extending angularly therearound, a first coupling link being connected to the segment member at one angular and thereof for communication of force from said torque tube and a second coupling link being connected between an opposed angular end of said segment member and said rear cable restraining means.

5. The combination according to claim 2 wherein the frame structure includes a first portion along one side of the wheel and a second portion along an opposed side of the wheel, the ski surface bridging the first and second portions of the frame structure and having an opening therein between the first and second portions through which the tire surface extends in the first raised position of the frame structure.

6. The combination according to claim 5 wherein said ram means includes a first ram extending between the axle and the first portion of the frame structure and a second ram extending between the axle and the second portion of the frame structure.

7. The combination according to claim 5 wherein the ram means comprises a piston and cylinder combination having an end of the piston connected to one of the axle and the frame structure and an end of the cylinder connected to the other of the axle and the frame structure for direct operation therebetween.

8. The combination according to claim 5 wherein the rear cable restraining means comprises a first cable and a second cable, the first cable being connected to a first link member at one end of the link shaft and a second cable being connected to a second link member at an opposed end of the link shaft.

9. The combination according to claim 2 wherein the ram means comprises a piston and cylinder combination having an end of the piston connected to one of the axle and the frame structure and an end of the cylinder connected to the other of the axle and the frame structure for direct operation therebetween.

10. The combination according to claim 2 wherein the front cable restraining means is elastically extendible and the rear cable restraining means is non-extendible.

11. The combination according to claim 2 wherein the link member is arranged such that movement of the frame structure relative to the axle causes movement of the rear cable restraining means relative to the frame structure by a length greater than the movement length thus allowing said position on the frame structure rearwardly of the axle to move by a first distance to accommodate said movement length and a second distance beyond said first distance to change said attitude of the ski surface about the axle.

12. A landing wheel and ski combination for an aircraft for use of a tire surface in movement across firm ground and a ski surface for movement across snow-covered ground, the combination comprising a rotatable landing wheel having a ground engaging tire surface, an axle on which the wheel is mounted for rotation, a support assembly for the axle for mounting the wheel on the aircraft, a ski assembly mounted on the axle so as to be carried thereby, the ski assembly including a bottom ski surface for movement across the snow-covered ground, a frame structure providing structural support for the ski surface, ram means actuable to cause movement of the frame structure through a movement length relative to the axle between a first raised position in which the tire surface projects below the ski surface for movement across the firm ground and a second lowered position in which the ski surface is arranged at a height relative to the tire surface for movement across the snow-covered ground, a front cable restraining means connected to a position on the frame structure forwardly of the axle, a rear cable restraining means connected to the frame structure at a position thereon rearwardly of the axle, said front and rear cable restraining means being arranged to maintain a required attitude of the ski about the axle, and lever means responsive to said movement of the frame structure relative to the axle to cause movement of the rear cable restraining means relative to the frame structure position, said lever means comprising a link member mounted on said frame structure at said position on the frame structure rearwardly of said axle, means mounting the link member for rotation about an axis transverse to the frame assembly, an end of the rear cable restraining means being attached to the link member such that rotation of the link member about said axis causes the rear cable restraining means to be paid out and drawn in relative to the frame structure, a first and a second lever extending longitudinally of the frame structure, means at a first end of each of the first and second levers connecting the first end of each of the first and second levers to a respective end of the axle, a torque tube interconnecting the first and second levers mounted on the frame structure and arranged to maintain simultaneous movement of the frame structure relative to the ends of the axle and means connecting the torque tube to the link member such that movement of the frame structure relative to the axle causes pivoting of the first and second levers to rotate the link member about the axis.

13. The combination according to claim 12 wherein said means mounting the link member comprises a link shaft extending transversely to the frame structure.

14. The combination according to claim 13 wherein each of the first and second levers includes a portion thereof extending from the torque tube to the link shaft.

15. The combination according to claim 13 wherein the link shaft carries a segment portion on a surface thereof projecting radially outwardly therefrom and extending angularly therearound, a first coupling link being connected to the segment member at one angular end thereof for communication of force from said torque tube and a second coupling link being connected between an opposed angular end of said segment member and said rear cable restraining means.

16. The combination according to claim 12 wherein the frame structure includes a first portion along one side of the wheel and a second portion along an opposed side of the wheel, the ski surface bridging the first and second portions of the frame structure and having an opening therein between the first and second portions through which the tire surface extends in the first raised position of the frame structure.

17. The combination according to claim 16 wherein said ram means includes a first ram extending between the axle and the first portion of the frame structure and a second ram extending between the axle and the second portion of the frame structure.

18. The combination according to claim 16 wherein the ram means comprises a piston and cylinder combination having an end of the piston connected to one of the axle and the frame structure and an end of the cylinder connected to the other of the axle and the frame structure for direct operation therebetween.

19. The combination according to claim 16 wherein the rear cable restraining means comprises a first cable and a second cable, the first cable being connected to a first link member at one end of the link shaft and a second cable being connected to a second link member at an opposed end of the link shaft.

20. The combination according to claim 12 wherein the ram means comprises a piston and cylinder combination having an end of the piston connected to one of the axle and the frame structure and an end of the cylinder connected to the other of the axle and the frame structure for direct operation therebetween.

* * * * *